(No Model.)
C. C. ALEXANDER.
SLIDING AND SWINGING GATE.
No. 428,160. Patented May 20, 1890.
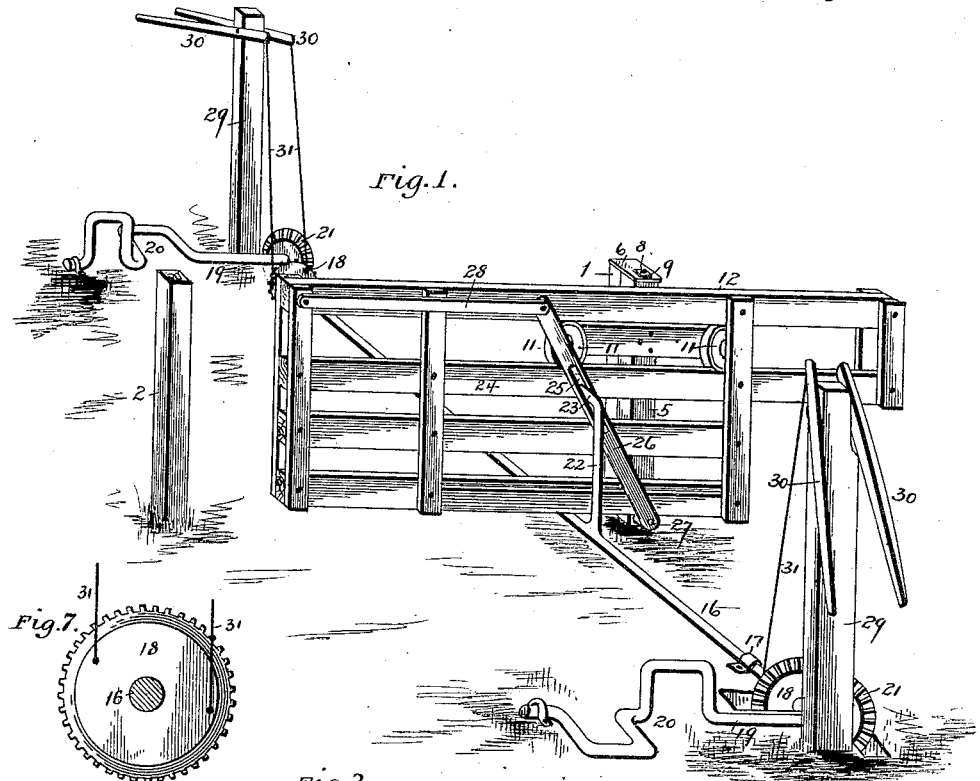
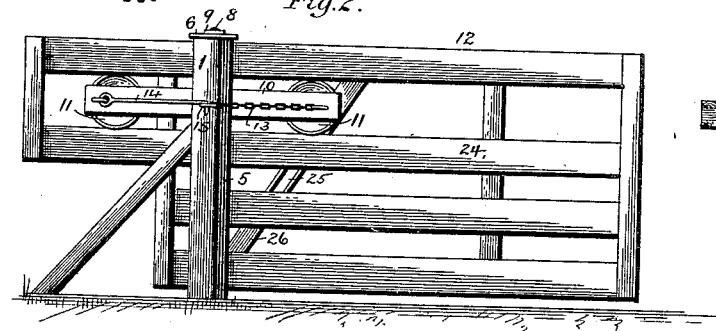
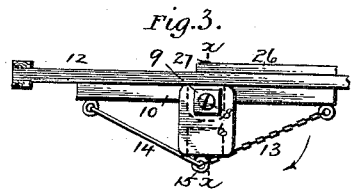
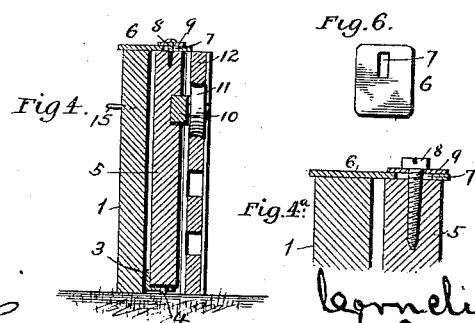
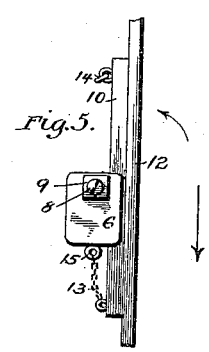
WITNESSES:
INVENTOR
Cornelius C. Alexander
BY
Johnson and Johnson
his ATTORNEYS.

UNITED STATES PATENT OFFICE.

CORNELIUS C. ALEXANDER, OF HARTFORD CITY, INDIANA.

SLIDING AND SWINGING GATE.

SPECIFICATION forming part of Letters Patent No. 428,160, dated May 20, 1890.

Application filed January 29, 1890. Serial No. 338,530. (No model.)

*To all whom it may concern:*

Be it known that I, CORNELIUS C. ALEXANDER, a citizen of the United States, residing at Hartford City, in the county of Blackford and State of Indiana, have invented new and useful Improvements in Sliding and Swinging Gates, of which the following is a specification.

My invention is directed to improvements in sliding and swinging gates, and the particular matters of my improvements will be specifically pointed out in the claims concluding this specification.

My improvement provides a novel construction whereby the gate may be opened and closed by a sliding movement only, effected by hand-levers or by the automatic action of the wheels of a vehicle upon crank-shafts, and whereby the gate may be opened and closed by a swinging and sliding movement effected by hand for the purpose of opening the gate wider than can be done by sliding it only, which is an important advantage in gates of this kind, because it frequently happens that a wider passage through the gate is required than is ordinarily necessary. By this novel construction when the gate is to be operated by the hand-levers or by the wheels of the vehicle, the gate-post, in order to maintain the connection of the gate with such means for operating it, is locked by a hook-and-chain attachment, so that the gate cannot be turned upon its journals, since the connection is such as to be self-releasing when the gate is opened by a swinging movement.

Referring to the accompanying drawings, Figure 1 represents in perspective a sliding and swinging gate having my improvements applied thereto. Fig. 2 shows that side of the gate not seen in Fig. 1, and the hook-and-chain attachment by which the gate-post proper is prevented from swinging upon its pivots. Fig. 3 shows the same locking attachment in top view. Figs. 4 and 4ᵃ are vertical sections taken on the line *x x* of Fig. 3. Fig. 5 is a top view showing the gate in position when both swung and slid open. Fig. 6 shows the slotted plate of the gate-post cap, and Fig. 7 shows the connection of the hand-lever cords with the gate-operating gear.

The gate is mounted upon the side post 5, the journals of which are secured in brackets 3 and 6, which are secured to the fixed ground-post 1, (shown in Fig. 4,) so that said post 5 can be turned upon its journals. The mounting of the gate is made by its top rail 12 upon grooved rolls 11, which are journaled upon the ends of a cross-bar 10, fixed to the upper portion of the gate-post 5, so as to be turned with the latter and with the gate, and it is upon these rolls that the gate can be slid to open and to close it. When so used, the gate must be prevented from swinging upon its post 5, in order that the connection of the gate with the automatic operating devices may be maintained. This provision for locking the gate-supporting post against turning consists of a chain 13, connected at one end to the cross-bar 10 and at its other end to the fixed ground-post 1, and a hook 14, pivoted to the other end of the cross-bar 10 and engaging an eye 15 upon the said ground-post, as in Figs. 2 and 3, so that the gate is thereby prevented from being swung open in either direction, the chain holding it from being swung open one way and the hook holding it from being swung open the other way by locking the gate-post cross-bar with the ground-post.

For operating the gate by the wheels of the passing vehicle I use the following means: A shaft 16, journaled in surface-bearings 17 at that side of the roadway next the gate-post and in the line of the road, has a bevel-wheel 18 at each end. At each end of this shaft and at right angles thereto is journaled in surface-bearings a shaft having double cranks 20, which stand at right angles and extend sufficiently across the road-track to receive the action of the wheels of the vehicle, and by means of bevel-gear 21 on the ends of these crank-shafts engage the bevel-gear of the shaft 16 and turn or rock it. A radial arm 22 of this shaft 16 engages by a right-angled end 23 a slot 25 in a bar 26, pivoted at its lower end to a horizontal stud 27 on the lower end of the gate-post. The upper end of this pivoted slotted bar connects with the upper front end of the gate by a horizontal pivoted bar 28, and by such connection the gate is slid open and closed by the back and forth movements of the rock-shaft arm, caused by the rocking of such shaft, as stated. In this connection it will be noticed that the crank end 23 of the rock-shaft arm 22 is free to be withdrawn from the slot of said arm when the gate is swung open in a direction away from such arm, and that said crank end can be again easily inserted into said slot when the gate is to be operated by it.

Provision is made for operating the gate by hand-levers 30 30, which are pivoted to the upper end of a post 29, fixed outside of each crank-shaft, the short ends of the levers being next to the gate and connected to the bevel-wheels 18 at opposite points of their diameters, as in Fig. 7, so that the gear-wheels 18 and their shaft 16 may be partly revolved by moving the levers down, one or the other, as it may be desired to open or to close the gate from either side thereof.

In operating the gate by the crank-shafts the wheels of the vehicle, in passing over the crank that stands upward at one side of the gate, rock the shaft 16, and by its arm 22 slides the gate open. When the vehicle has passed through the gate, its wheels will pass over the raised crank of the shaft on the other side of the gate, and rocking the said shaft 16 will slide the gate closed.

When it is desired to open the gate wider than can be done by sliding it, the hook 14 is unhooked from the fixed ground-post, and the gate-post thereby unlocked from the ground-post, and the gate can be swung entirely open, free from its crank-operating arm 22, as shown in Fig. 5.

At the upper journal of the gate-post I provide a slot 7 in the bracket or cap 6, through which the journal-bolt 8 passes, and also through a top clamp-plate 9 upon said bracket, and this slot and clamp-plate allow the post to be set and kept in a true vertical position.

The provision of the double hand-levers on each side of the gate allows the latter to be opened and closed from either side, and this operation places the cranks at each side of the gate in position to receive the action of the wheels of the vehicle either to close or to open the gate, and in this way these two operating devices co-operate.

It will be noticed that when the gate is operated by the cranks or by the levers the action of the arm 22 would tend to swing the gate open, and thus fail to act were it not for the locking attachment acting to prevent the gate from turning.

I claim as my improvement—

1. In a sliding gate, the combination, with the sliding gate, of a shaft 16, journaled parallel with the roadway, connected to slide said gate, and provided with bevel-gear 18 at its ends, two shafts 19, formed each with double cranks 20, at right angles to each other, projecting into the roadway and provided with bevel-gear 21 upon their ends engaging with said bevel-gear of the shaft 16, hand-levers fulcrumed upon said posts, and chains secured to the short arms of said levers and to diametrically-opposite points of the gear upon said crank-shaft, substantially as described.

2. In a sliding and swinging gate, the combination, with a gate supported to slide and swing upon its pivot-post, and arms 23 and 28, pivoted to each other and to the upper and outer corner of the gate and to the lower end of the pivot-post, the arm 23 having a slot 25, of a rocking arm 22, fulcrumed near the pivot-post, having means for rocking it, and formed with a bent outer end which enters the slot of said arm, substantially as described.

3. In a sliding and swinging gate, the combination of the fixed ground-post having brackets at its upper and lower ends, a gate-post pivoted in said brackets and provided with a cross-bar 10, a gate supported to slide upon said cross-bar, a chain 13, attached to one end of said cross-bar and to an eye 15 upon said ground-post, and a hook 14, pivoted to the other end of said cross-bar and engaging said eye, substantially as described.

4. In a sliding gate, the combination of the fixed ground-post, the gate, and a pivoted gate-supporting post 5, having a cross-bar 10, with the chain 13, connecting one end of said cross-bar with the ground-post, and the hook 14, connecting the other end of said cross-bar with the said ground-post, whereby the said gate may be opened and closed with a sliding movement only, or with a swinging movement, substantially as described, for the purpose stated.

In testimony whereof I have hereunto set my hand in the presence of two subscribing witnesses.

CORNELIUS C. ALEXANDER.

Witnesses:
CARRY TAUGHENBAUGH,
ELISHA PIERCE.